Sept. 3, 1946.  M. SUMMERFIELD  2,406,926
SYSTEM OF JET PROPULSION
Filed Aug. 6, 1943  2 Sheets-Sheet 1
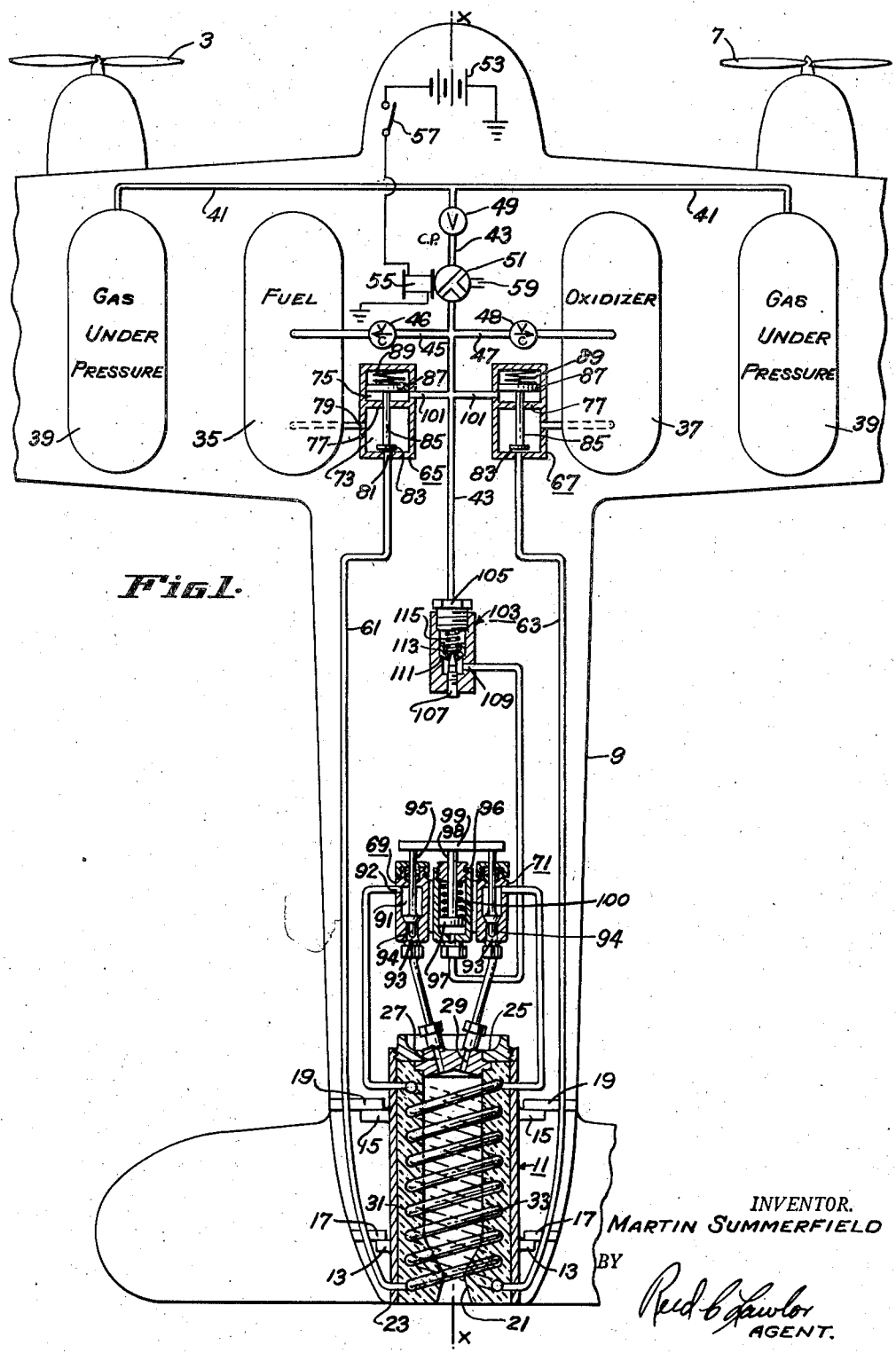
INVENTOR.
MARTIN SUMMERFIELD
BY
Reed C Lawlor
AGENT.

Sept. 3, 1946.  M. SUMMERFIELD  2,406,926
SYSTEM OF JET PROPULSION
Filed Aug. 6, 1943  2 Sheets-Sheet 2
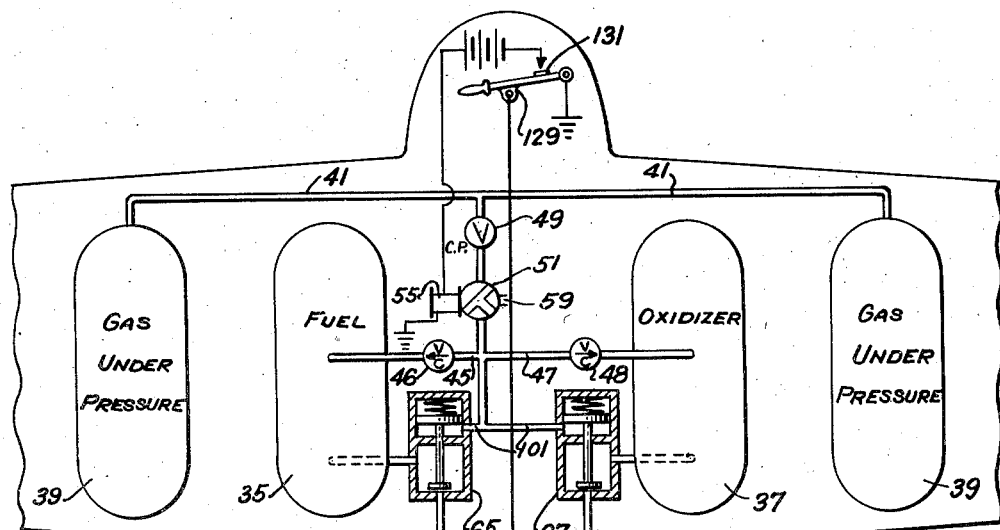
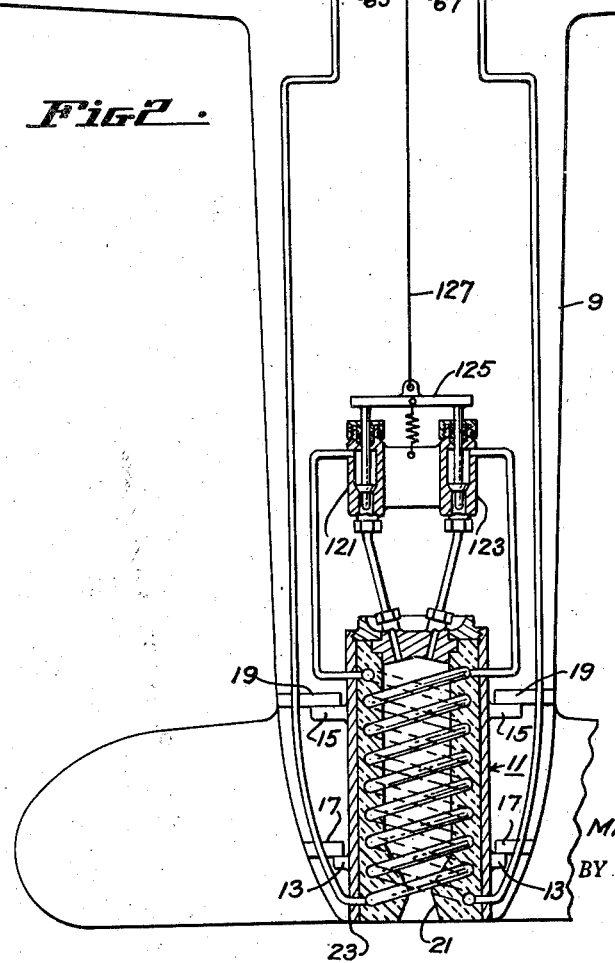
INVENTOR.
MARTIN SUMMERFIELD
BY
Reed C. Lawlor
AGENT.

Patented Sept. 3, 1946

2,406,926

UNITED STATES PATENT OFFICE 2,406,926

SYSTEM OF JET PROPULSION

Martin Summerfield, Pasadena, Calif., assignor to Aerojet Engineering Corporation, Azusa, Calif., a corporation of Delaware Application August 6, 1943, Serial No. 497,625

7 Claims. (Cl. 60—35.6)

My invention pertains to jet propulsion systems adapted for propelling vehicles, especially aircraft. In particular my invention pertains to apparatus for controlling the flow of propellants in such systems.

One practical system of jet propulsion utilizes a pair of liquid propellants as a source of energy. These propellants are stored in separate containers and means are provided for introducing the two propellants simultaneously into the combustion chamber of a jet motor, where the propellants mix and react with the liberation of a large quantity of heat. The reaction of such liquid propellants may be initiated or sustained with the aid of ignition means or may occur spontaneously if the two propellants are spontaneously combustible.

In either event the thermal energy released from the propellants generates gas in the motor at high temperature and pressure. The gas is expelled through a nozzle in the wall of the combustion chamber. As the gas is expelled through the nozzle, it produces a mechanical reaction on the motor thereby creating a thrust which may be utilized to propel or otherwise control an airplane upon which such a motor is installed.

Wherever jet motors are to be used for any considerable length of time means are provided for cooling the jet motor. One such system utilizes cooling coils in the motor wall and propellants are led from their respective containers into the combustion chamber through conduits which include the cooling coils. There is a small possibility that the motor might burst during operation thereby breaking the propellant conduits. When such a system is used in military aircraft there is also a possibility that parts of the conduit external to the motor may be severed by bullets. In either case, the release of propellants, especially if they are spontaneously combustible, may result in serious damage to the airplane and even endanger the lives of its occupants.

I have found that if normally closed, slowly opening valves are included in the conduits between the cooling coils and the means for injecting fuel and oxidizer into the motor, and if normally closed, rapidly opening valves are installed in the conduits at the ends thereof adjacent to the propellant containers both smooth starting of the jet motor may be obtained and a high degree of safety provided.

Accordingly, the principal object of my invention is to provide a safe and simple means for smoothly controlling the flow of propellants into a jet motor connected to propellant containers by means of conduits of considerable length.

A further object of my invention is to provide simple means for initiating the smooth operation of a jet motor while still providing a high degree of safety.

While my invention is particularly applicable in a jet propulsion system utilizing a pair of spontaneous combustible propellants, it is also applicable when the propellants are not spontaneously combustible. Even in the latter case there may also be considerable danger to an airplane upon which the jet propulsion system is mounted because the propellants might burst into flame from any one of a number of causes. Thus propellants which are not spontaneously combustible at atmospheric temperature might be ignited by contact with the heated motor or from a spark produced by a bullet striking the plane.

It is to be understood that my invention is not to be limited to the specific forms described herein but that various modifications may be made in them without departing from the spirit of my invention as defined in the appended claims.

These and other objects of my invention will be readily understood by reference to the following detailed description when taken in conjunction with the accompanying drawings in which:

Fig. 1 is a partly schematic view in part cross section of one embodiment of my invention; and Fig. 2 is a partly schematic view in part cross section of another embodiment of my invention.

Similar numerals refer to similar parts throughout the views.

In Fig. 1 I have shown part of a twin motor airplane utilizing two screw propellers 3 and 7 symmetrically located on opposite sides of the longitudinal axis X—X extending through the center of the fuselage 9. A jet motor 11 of cylindrical cross-section throughout the major portion of its length, is supported by an convenient means such as flanges 13 and 15 from brackets 17 and 19 in the tail of the fuselage. The jet motor has a converging-diverging nozzle 21 of the De Laval type at the rear end thereof positioned to expel gas through an opening 23 in the fuselage tail. The head of the combustion chamber 25 having two injection orifices 27 and 29 therein forms the forward end wall of the motor. The hollowed out portion of the motor between the nozzle and the injector forms a combustion chamber.

Two helically shaped cooling coils 31 and 33 are incorporated in the wall of the jet motor in heat exchange relation therewith.

Two propellant containers 35 and 37 adapted for containing fuel and oxidizer respectively are symmetrically arranged on opposite sides of the fuselage axis.

A pair of containers 39, 39 of gas at high pressure are arranged on opposite sides of said axis and on the outboard side of the propellant tanks 35 and 37.

The two gas containers 39, 39 connect through corresponding lines 41, 41 to a common control line 43, which in turn is connected to the tops of the propellant tanks 35 and 37 through branch lines 45 and 47 respectively. Check valves 46 and 48 are included in the branch lines 45 and 47 respectively to prevent vapors from the propellant containers from escaping into the control line and mixing there.

A regulator 49 and a three-way electromagnetic valve 51 are connected in said control line 43 with the regulator on the high pressure side of the valve.

Gas under pressure may be admitted to the control line by applying current from a battery 53 to the coil 55 of said electromagnetic valve by closing the control switch 57. When said control switch is open the low pressure side of said common line communicates with the atmosphere through a vent 59.

Conduits 61 and 63 including the cooling coils 31 and 33 respectively are connected between the bottoms of the propellant tanks 35 and 37 respectively and the corresponding injection orifices 27 and 29.

Rapidly opening, normally closed valves 65 and 67 are included in the respective conduits 61 and 63 respectively adjacent the propellant container ends thereof, and slowly opening, normally closed valves 69 and 71 are included in said conduits 61 and 63 between the corresponding cooling coils and the injection orifices. The former valves are adapted to maintain the propellant tanks closed, thereby preventing leakage of propellants in the event that said conduits should become broken. The latter valves are of a type which may be opened gradually to prevent a sudden inrush of propellants into the combustion chamber when said first valves are opened.

Said propellant flow control valves 65, 67, 69, and 71 may be pneumatically controlled by means of gas under pressure in said control line 43.

As shown here each of the rapidly opening valves may be of the type having a cylindrical body divided into a working chamber 73 and a control chamber 75 by means of a wall 77 intermediate the ends of the valve body. The working chamber has an inlet 79 communicating with the corresponding propellant tank and an outlet 81 connected to a cooling coil, said outlet being normally closed by a valve head 83. The shaft 85 supporting the valve head extends through a bore in said wall 77 into the control chamber where it terminates in a piston 87. The valve head 83 is maintained in a normally closed position by means of a compression spring 89 positioned between said piston and the exterior wall of the valve.

Said rapidly opening valves 65 and 67 are arranged to be opened when gas under pressure is admitted to the portion of the control chamber formed between said wall and said piston.

Each of said slowly opening valves may be of a type having a working chamber 91 having an inlet 92 communicating with one end of a corresponding cooling coil and an outlet 93 connected to an orifice in the injector 25. Said valve head has a pintle shaped head 94, the position of which in the outlet may be varied by axial movement of a valve shaft 95 thus controlling the degree of opening in the discharge port 93 thereof and thus control the rate of flow of the corresponding propellant into the combustion chamber. The position of the pintle heads in these valves may be controlled by the introduction of gas under pressure into an associated pneumatic control element 96.

Said control element 96 may be in the form of a cylinder in the interior of which there is slidably included a piston 97 supported on a shaft 98 extending through the end of the cylinder wall. A cross piece 99 is rigidly secured to said piston shaft 98 and the pintle head shaft 95 of each of the slowly opening valves. These valves are normally maintained in the closed position by means of a compression spring 100 acting on the control piston 97 in the opposite direction to the gas pressure.

The control line 43 communicates with the control chambers of said rapidly opening valves through branch lines 101, 101 and with the control chamber of the control element 96 connected to the slowly opening valves.

A one-way restrictor 103 is included in the portion of the control line leading to the working chamber of said control element.

Said one-way restrictor generally has a hollow cylindrical body at one end of which there is an inlet 105 and through the other end of which there extends a needle valve 107, threaded at the blunt end which extends through the body wall and tapered on the end thereof which projects into the restrictor chamber. There is an outlet 109 in the said wall opposite the tapered end of said rod. A conical valve seat 111 is ground in the body wall intermediate the two ends and about opposite the position of the tapered end of said rod. A centrally apertured disc 113 acting as a valve head is normally urged against said valve seat by means of a compression spring 115. The tapered end of said needle valve is positioned so that it almost closes the opening in said disc when seated.

When gas flows from said inlet 105 to said outlet 109, the flow through the restrictor is retarded by virtue of the small size of the opening existing between said needle valve and disc. When gas flows in the opposite direction there is little resistance to flow because gas under pressure lifts the disc from the valve seat thus enlarging the passage between said needle valve and disc.

When the jet motor is not operating all valves 51, 65, 67, 69, and 71 are closed. In this condition the control chambers of valves 65, 67, 69, and 71 communicate with the surrounding medium through the vent 59 of valve 51.

To initiate operation of the motor, switch 57 is closed thereby opening the three-way valve 51, thus closing the vent and connecting the control chambers to the source of high pressure gas. When this occurs gas under pressure flows into the propellant containers 35 and 37 and into the control chambers 75 of the rapidly opening tank valves 65 and 67 and the control chamber of the control element connected to the slowly opening injector valves 69 and 71. All of the propellant flow control valves 65, 67, 69, and 71 open substantially simultaneously, the tank valves opening rapidly and the injector valves opening slowly.

When these valves open gas under pressure in the propellant containers forces the propellants through their respective conduits and valves into the combustion chamber where they mix and burn thereby releasing energy and expelling gas through the jet motor nozzle at high velocity.

The rate at which said injector valves open depends upon the setting of the rod 107 in the restrictor. Preferably the opening of these valves is so timed that they continue to open gradually even after the flow of propellants into the combustion chamber has been initiated. In this manner the temperature and pressure of the gases in the chamber is increased gradually and any shock that might otherwise be produced is reduced considerably.

It will be noted that all four propellant control valves open substantially simultaneously thus permitting any air contained in the corresponding conduits to be rapidly forced through the propellant lines into the combustion chamber ahead of the propellants.

The operation of the motor may be stopped by opening switch 57 which closes valve 51 by de-energizing its operating coil 55, and shutting off the pressure in the upper chambers of flow control valves 65 and 67, thereby causing these flow control valves to close.

In the form of my invention herein before described provision is made for slowly initiating the flow of oxidizer and fuel into the combustion chamber and for protecting the jet propulsion system against dangerous leakage in the event that the propellant flow conduits become broken for any reason.

In Fig. 2 I have shown a second embodiment of my invention which is particularly applicable wherever jet propulsion is used as the sole or primary source of power. Thus for illustrative purposes an airplane is shown here which does not utilize any screw propellers whatever. It is to be understood however that the jet propulsion throttling system of Fig. 2 may be applied to the twin motor airplane of Fig. 1.

The system of Fig. 2 is similar to that of Fig. 1 except for the fact that throttle valves 121 and 123 are used between the cooling coils and the injection orifices and means are provided for adjusting the degree of opening of the throttle valves. With this system the rate of injection and hence the thrust available for propelling the airplane may be controlled.

As shown shafts of the throttle valves are connected to a common crosspiece 125. This crosspiece in turn is connected by means of a cable 127 under tension to a throttle lever 129. By adjustment of the position of the throttle lever the position of the valve heads in said throttle valves and hence the rate of flow of propellants therethrough may be controlled. A grounded contact 131 on the lever is arranged to close the circuit of battery 53 simultaneously with the opening of said throttle valves. With this arrangement the tank valves 65 and 67 may be opened and closed simultaneously with said throttle valves and the degree of opening of said throttle valves readily controlled.

It is thus seen that I have provided a jet propulsion system which is simple and convenient to operate and which provides a maximum degree of safety in the event the conduits between the propellant tanks and jet motor are broken.

I claim:

1. In a jet propulsion system adapted for propelling a vehicle, the combination of a jet motor mounted on the vehicle, said motor comprising a combustion chamber having a nozzle in the wall thereof, means for injecting fuel and oxidizer into said chamber, a fuel container and an oxidizer container on the vehicle, conduits of considerable length connecting said containers with the injection means, each of said conduits being formed into a cooling coil around the combustion chamber, means for forcing the fuel and oxidizer through said conduits, a first normally closed valve in each conduit adjacent the corresponding container, a second normally closed valve in each conduit between the injection means and the corresponding cooling coil, and means including common valve actuating means for opening said first valves simultaneously and for gradually opening the second valves during the initiation of the flow of oxidizer and fuel into the combustion chamber.

2. In a jet propulsion system adapted for propelling a vehicle, the combination of a jet motor mounted on the vehicle, said motor comprising a combustion chamber having a nozzle in the wall thereof, means for injecting fuel and oxidizer into said chamber, a fuel container and an oxidizer container mounted on the vehicle, conduits of considerable length connecting said containers with the injection means, each of said conduits being formed into a cooling coil around the combustion chamber, means for forcing the fuel and oxidizer through said conduits, a normally closed valve in each conduit adjacent the corresponding container, a normally closed throttle valve in each conduit between the injection means and the corresponding cooling coil, and means including common valve actuating means for opening and closing all of said valves substantially simultaneously, and for opening the throttle valves more slowly than the valves adjacent the containers.

3. In a jet propulsion system adapted for propelling a vehicle, the combination of a jet motor mounted upon the vehicle, said motor comprising a combustion chamber having a nozzle, a fuel injection orifice, and an oxidizer injection orifice in the wall thereof, a pair of cooling coils in heat exchange relationship with the chamber, and a fuel container and an oxidizer container mounted on the vehicle remote from said jet motor, conduits including corresponding cooling coils connecting said containers with the respective injection orifices, a slowly opening valve in each conduit between each cooling coil and the corresponding injection orifice, a rapidly opening valve in each conduit adjacent the corresponding container, and valve actuating means operatively connected to said valve and remote therefrom adapted for operating said valves simultaneously, whereby the flow of oxidizer and fuel into the combustion chamber may be initiated slowly.

4. In a jet propulsion system the combination comprising a jet motor, a pair of propellant containers, separate conduits connecting said containers and the jet motor, means for forcing said propellants through said separate conduits, a first normally closed valve in each conduit adjacent the corresponding container, a second normally closed valve in each conduit adjacent said jet motor, and means including common actuating valve means for opening said first valves simultaneously and for gradually opening said second valves during the initiation of the flow of propellants into said motor.

5. In a jet propulsion system, the combination comprising a jet motor having a combustion chamber, a pair of propellant containers, a pair of coils in heat conducting contact with said chamber, separate conduits connecting said pair of coils with the corresponding containers, means for forcing said propellants through said conduits, a first normally closed valve in each conduit adjacent the corresponding container, a second normally closed valve in each conduit between said coil and said combustion chamber, and means including common actuating valve means for opening said first valves simultaneously and for gradually opening said second valves during the initiation of the flow of propellants into said combustion chamber.

6. In a jet propulsion system the combination comprising a jet motor, a propellant container, a conduit connecting the container to the jet motor, means for forcing propellant through the conduit, a first normally closed valve in the conduit adjacent the container, a second normally closed valve in the conduit adjacent the motor, and means including common valve actuating means for opening the valves simultaneously while causing the second valve to open more gradually than the valve near the container during the initiation of the flow of propellant into the motor.

7. In a jet propulsion system the combination comprising a jet motor, a propellant container, a conduit connecting the container to the jet motor, means for forcing the propellant through the conduit, a first normally closed valve in the conduit adjacent to the container, a second normally closed valve in the conduit adjacent the motor, and means for initiating the opening of both said valves simultaneously while causing the second valve to open more gradually than the first valve during the initiation of the flow of propellant into the motor.

MARTIN SUMMERFIELD.